United States Patent [19]

Kartalopoulos

[11] Patent Number: 5,383,180
[45] Date of Patent: Jan. 17, 1995

[54] CIRCUIT PACK FOR DIGITAL LOOP CARRIER TRANMISSION SYSTEMS

[75] Inventor: Stamatios V. Kartalopoulos, Annandale, N.J.

[73] Assignee: AT&T Corp., Murray Hill, N.J.

[21] Appl. No.: 65,001

[22] Filed: May 24, 1993

[51] Int. Cl.6 .......................................... H04Q 11/04
[52] U.S. Cl. ................................. 370/58.2; 370/15; 370/68; 370/68.1; 370/110.1; 371/20.5; 379/5
[58] Field of Search .................... 370/15, 58.2, 66, 68, 370/68.1, 110.1; 371/20.5; 379/5

[56] References Cited

U.S. PATENT DOCUMENTS

| | | | |
|---|---|---|---|
| 4,583,218 | 4/1986 | Ardon et al. | 370/58.3 |
| 4,596,010 | 6/1986 | Beckner et al. | 370/60 |
| 4,860,281 | 8/1989 | Finley et al. | 370/15 |

*Primary Examiner*—Douglas W. Olms
*Assistant Examiner*—Russell W. Blum
*Attorney, Agent, or Firm*—Lester H. Birnbaum

[57] ABSTRACT

Disclosed is a circuit which allows a digital loop carrier remote terminal to communicate with a local digital switch having a TR8 interface. The circuit includes a pair of microprocessors and time slot interchangers which multiplex, demultiplex and distribute the data fields associated with the interface.

9 Claims, 2 Drawing Sheets

CIRCUIT PACK FOR DIGITAL LOOP CARRIER TRANMISSION SYSTEMS

BACKGROUND OF THE INVENTION

This invention relates to digital loop carder transmission systems.

In digital loop carder transmission systems, such as Subscriber Loop Carder (SLC®) Systems, bidirectional communication usually takes place between a local digital switch and a remote terminal located in the vicinity of a customer's premises. Information is transferred over the bidirectional link in time slots which are positioned in a particular frame format. This frame format will differ depending on the type of interface at the local digital switch. One type of framing, designated "Fs" or D-4 mode, utilizes a sequence of 12 frames to form a superframe and supervisory signaling bits embedded in a certain pattern. This frame format is used with the standard TR8 interface. A standard TR303 interface at the local digital switch requires a superframe of the "Fe" type or extended superframe (ESF) which comprises a sequence of 24 frames in a superframe with supervisory signaling embedded in a different pattern.

While newer equipment is built for compatibility with the TR303 interface, it is also desirable to permit a remote terminal to process information in a way which is compatible with existing TR8 interfaces.

SUMMARY OF THE INVENTION

The invention is a circuit for receiving and transmitting data link signals in a digital loop transmission system. The circuit includes a first time slot interchanger for receiving frames of information from a local digital switch. A first microprocessor is coupled to the first time slot interchanger and includes means for commanding the time slot interchanger to interchange designated time slots in the frames to a designated transmission path. A serial/parallel converter with programmable delay compensation is coupled to the transmission path in order to receive the designated time slots. A second microprocessor is coupled to the converter and is adapted for commanding the converter to send to it data link bits from the designated time slots and for assembling the bits into designated fields. The second microprocessor is coupled to the first microprocessor in order to send to the first microprocessor the designated fields.

BRIEF DESCRIPTION OF THE DRAWING

These and other features of the invention are delineated in detail in the following description. In the drawing.

DETAILED DESCRIPTION

The circuit 10 in accordance with an embodiment of the invention includes a time slot interchanger (TSI) 11 which receives digital information in the form of a series of frames from the line interface unit (LIU) 12. As known in the art, the LIU is the portion of the remote terminal which receives the information from a local digital switch, 50, and converts it to the frame format illustrated in FIG. 2 where the system includes a TR8 interface at the local switch.

Figure 2:
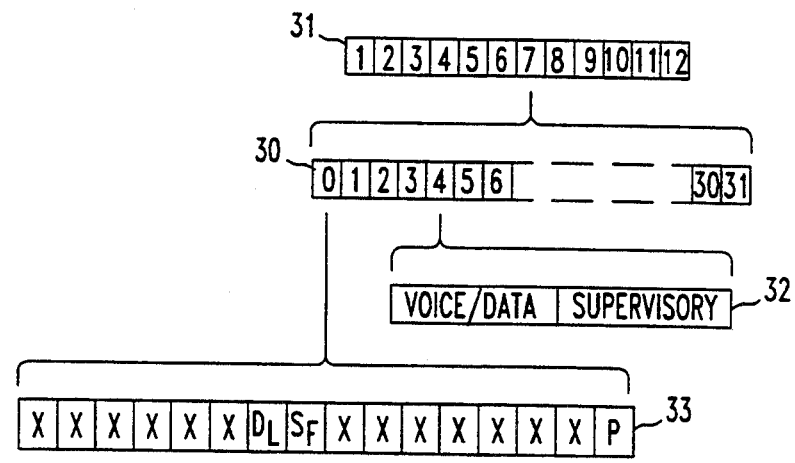
FIG. 2 illustrates schematically a frame of information received and/or transmitted by the circuit of FIG. 1.

As illustrated by block 30 of FIG. 2, the information is organized in a frame which typically consists of 32 time slots, and 12 of these frames, as illustrated by block 31, forms a superframe. Each time slot which is used as a channel, as shown in block 32, consists of 16 bits, with 8 bits of digitized voice or data and 8 bits of supervisory signals related to that channel. Certain time slots, such as time slot zero, are not used to carry information on customer channels. As illustrated in block 33, time slot zero includes a data link bit ($D_L$), a superframe-defining bit ($S_F$), and a parity bit (P). The $S_F$ bit marks the beginning of a superframe, while the data link bit $D_L$ includes information, to be described, which relates to the system.

Returning to FIG. 1, the TSI, 11, functions to interchange the time slots that contain the $D_L$ and $S_F$ bits received from the LIU on path 13 with path 15. The remainder of the incoming information is placed on path 14 to the channel units 16 which are located at another portion of the remote terminal. The TSI, 11, performs this function under the command of a microprocessor, 17, which is coupled thereto by path 18. In this example, path 18 is an 8-bit parallel bus.

The bits on path 15 are transmitted to the input of a circuit indicated by box 20 and labeled "ON/OFF Hook Detect and Data Link Receive" according to its major functions. The circuit should be capable of receiving serial bit streams on a plurality of inputs (e.g., 15 and 25) and converting the serial bit streams to a parallel output on bus 22, which in this example is an 8-bit parallel bus. Also, the circuit should be capable of programmable delay compensation to ensure that the time slots and bits in the several inputs line up. Thus, the circuit 20 is, preferably, a standard time slot interchanger identical to TSI 11 since such TSIs already have these features.

Figure 3:
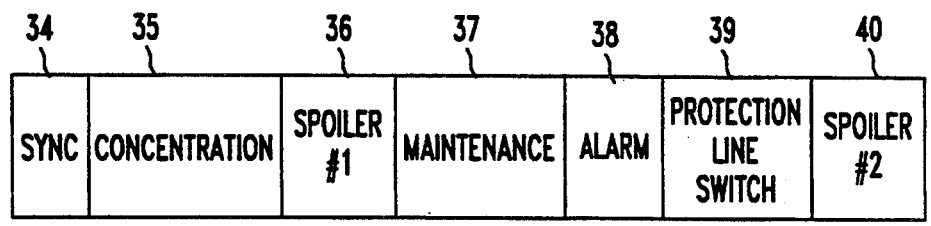
FIG. 3 illustrates a packet of information generated by the circuit of FIG. 1.

The TSI, 20, picks off the $D_L$ and $S_F$ bits and delivers them to a microprocessor, 21, which is coupled thereto by the parallel bus, 22. The microprocessor 21 assembles all the $D_L$ bits over a number of frames (typically 72 frames) to form an information packet which is illustrated by the block diagram of FIG. 3.

The packet is made up of a number of fields, in this example, those labeled "Sync", "Concentration", "Spoiler #1", "Maintenance", "Alarm", "Protection Line Switch" and "Spoiler #2". In this example, the packet is 36 bits in length (since every other frame is picked off) with each field having a different bit length. The sync field, 34, comprises 12 bits in a particular pattern to provide a packet header. The concentration field, 35, is 11 bits in length and contains commands from the local digital switch for connecting subscribers, through the channel units 16, to certain time slots in the TSI, 24, used for transmission of voice and data to the switch. The spoiler #1 field, 36, is 3 bits in length and does not include any information, but is used to ensure that the concentration field and maintenance field do not produce the same pattern as the sync field. The maintenance field, 37, is 3 bits in length and includes information related to the maintenance of the remote terminal. The alarm field, 38, is 2 bits in length and contains information related to system problems. The protection line switch field, 39, which is 4 bits in length, contains information related to the substitution of paths from the local switch in the event of failure. The spoiler #2 field, which is 1 bit in length, does not include information but is used to ensure that the maintenance, alarm, and protection line switch fields do not reproduce the pattern of sync field 34 in combination with the next packet.

The microprocessor 21 will communicate the information in the various fields to the microprocessor 17 over a path, 26. Microprocessor 17 will communicate the information from the maintenance field to the metallic distribution controller (MDC) 23 which is located at another portion of the remote terminal and which is responsible for controlling the various portions of the terminal. Information from the concentration field will be used by microprocessor 17 in order to control the TSI 24 over path 27 in the placement of time slots from the channel units 16 on path 25 to path 28 which leads to the line interface unit (LIU) 12 and onto the local switch (not shown). Information from the protection line switch and alarm fields will also be transmitted by microprocessor 17 to the MDC over path 29.

Microprocessor 17 will also receive maintenance, protection line switch and alarm fields generated by the MDC 23 for transmittal to the local digital switch. The microprocessor 17 will assemble all fields into a data link packet according to FIG. 3 and it will command the TSI 24 to put this information into time slot zero in the transmit direction. The information in each packet will be sent to the LIU 12 on path 28 and ultimately to the local digital switch (not shown) over 72 frames.

A further function performed by microprocessor 21 and TSI 20 relates to on/off-hook detection. Specifically, microprocessor 21 scans all data transmitted from the channel units 16 on path 25 for any bits indicating that one of the subscribers has gone off-hook. When such a bit is detected, the microprocessor 21 transmits a message to microprocessor 17 which includes this information in the concentration field of the packet it generates and sends it to the local digital switch in time slot zero via TSI 24, path 28 and LIU 12. The local digital switch will then send instructions in the time slot zero received by TSI 11 to connect the off-hook subscriber on paths 25 and 14 to an available time slot on paths 28 and 13. This information is processed as previously described.

The same procedure is followed when the subscriber eventually goes on-hook.

Figure 1:
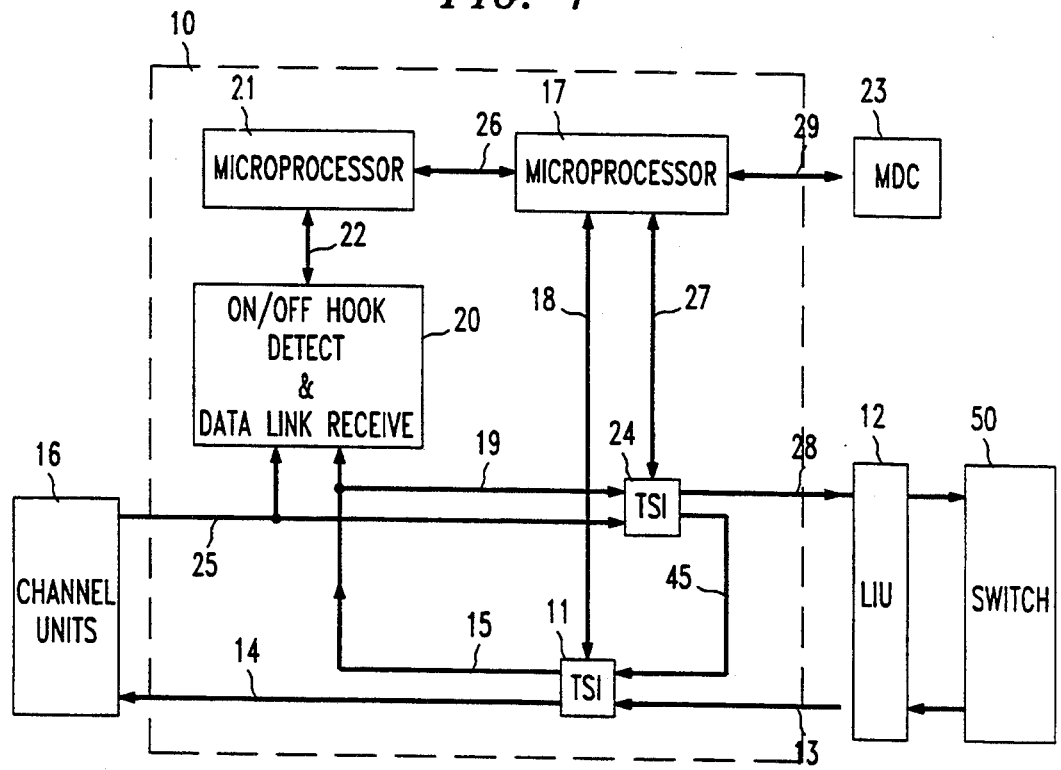
FIG. 1 is a block diagram of a circuit in accordance with an embodiment of the invention.

It will also be noted that the circuit of FIG. 1 includes a self-test feature in the form of a loop-back path between TSI 24 and TSI 11 comprising paths 15,19 and 45. The loop-back path includes designated, normally empty, circulating time slots. Microprocessor 17 can command TSI 24 to fill these circulating time slots with test data. When the filled time slot returns via TSI 11 and paths 45, 15 and 19, the microprocessor 17 can determine if the test data it reads is the same as the test data it wrote into TSI 24 and, thereby, conclude whether or not TSI 24 and TSI 11 are functioning properly.

Figure 4:
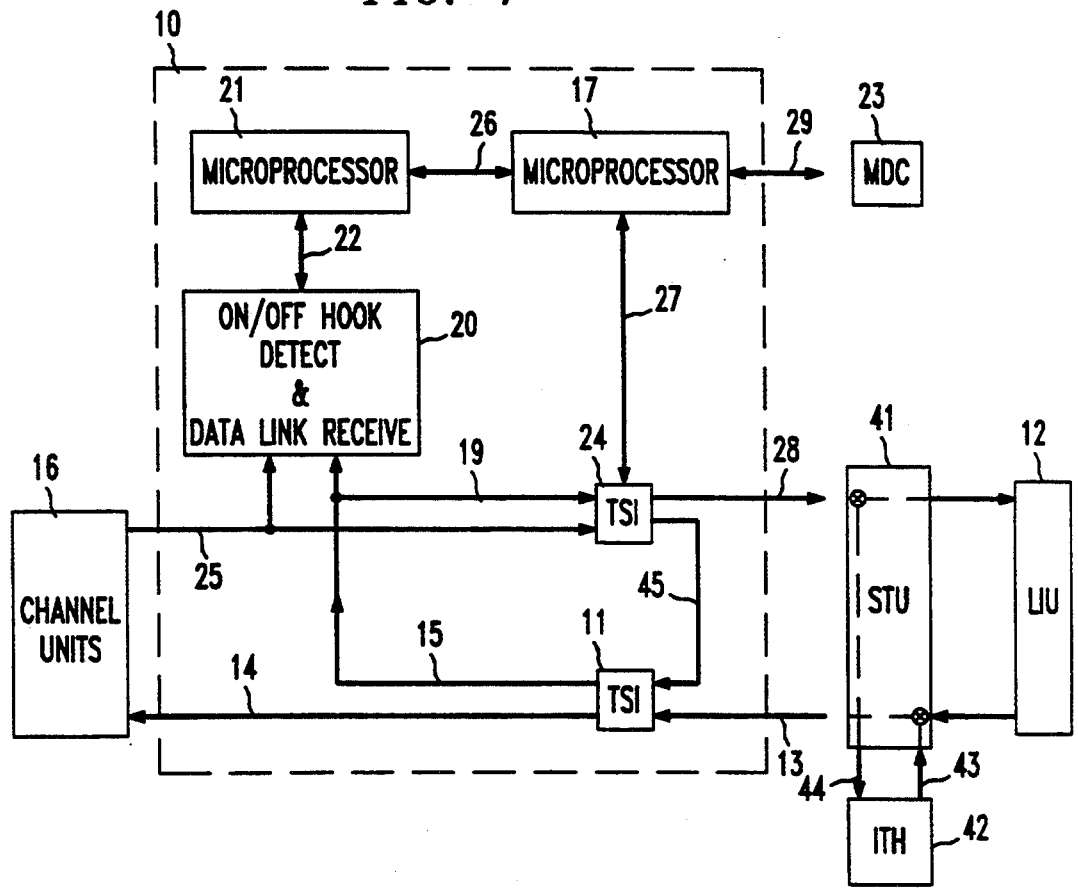
FIG. 4 is a block diagram in accordance with the same embodiment illustrating a feature of the invention.

FIG. 4 illustrates a further feature of the invention, with elements similar to those of FIG. 1 being similarly numbered. The remote terminal also includes a system timing unit (STU) illustrated as box 41, and an integrated test head (ITH) illustrated as box 42, which is coupled to the STU by transmit and receive paths, 43 and 44, respectively. The ITH allows the channel units 16 to be tested at the remote terminal by displacing a channel unit under test in the transmission path to the local digital switch. That is, the ITH will act like the channel unit being tested in that it receives and transmits information which would ordinarily be received and transmitted by the channel unit. The circuit 10 of the invention allows this displacement in the manner described below. More than one displacement may take place simultaneously as needed.

The circuit 10 is coupled to the STU by paths 13 and 28 in the receive and transmit directions, respectively. Normally, the STU is transparent to the information transmitted between the local digital switch and the circuit 10 (through LIU 12) and, consequently, was not illustrated in FIG. 1. However, the STU includes a time slot interchanger (not shown) which allows the ITH to transmit to and receive from circuit 10 information in certain null (non-subscriber used) time slots of the frames on paths 13 and 28.

When it is desired to test a particular channel unit, the MDC 23 sends a message to microprocessor 17 on path 29 which is passed on to microprocessor 21 on path 26. The message informs microprocessor 21 not to look for on/off-hook detection on path 25 for the tested channel unit. Instead, the TSI 11, which receives on/off-hook bits for that channel unit from the ITH on path 13, will, under the command of microprocessor 17, place those bits onto path 15 so that microprocessor 21 will detect those bits through TSI 20. Once microprocessor 21 detects off-hook from the ITH, it instructs microprocessor 17 which commands TSI 24 to put this information (appearing at the TSI on path 19) in an appropriate time slot to the local digital switch on path 28 through the STU 41 and LIU 12.

Information from the local switch, such as a ringing signal, will be transmitted through the STU 41, onto path 13, through TSI 11 and to TSI 24 via paths 15 and 19. The information will then be placed on path 28 to the TSI of the STU 41 and received by the ITH on path 44. Thus, the ITH has effectively replaced the tested channel unit during a test.

When a test is completed, or when service is required for the channel unit under test, the MDC will so notify microprocessors 17 and 21 so that normal service is restored.

Thus, it will be appreciated that a combination of microprocessors (17, 21) and time slot interchangers (11, 20, 24) provides synchronous data link operation compatible with the TR8 interface, displaces channel units for testing purposes, interchanges time slots between channel units and the local switch, and also permits self-testing in a convenient, inexpensive manner. While the receive (11) and transmit (24) TSIs are shown as separate, they could be combined into one TSI.

Various additional modifications will become apparent to those skilled in the art. All such variations which basically rely on the teachings through which the invention has advanced the an are properly considered within the scope of the invention.

I claim:

1. A circuit for receiving and transmitting data link signals in a digital loop transmission system comprising:
    a first time slot interchanger for receiving frames of information from a local digital switch;
    a first microprocessor coupled to the first time slot interchanger and adapted for commanding the time slot interchanger to interchange designated time slots in the frames to a designated transmission path;

a second time slot interchanger with programmable delay compensation coupled to the transmission path in order to receive the designated time slots;

a second microprocessor coupled to the second time slot interchanger and adapted for commanding the second time slot interchanger to send to it data link bits from the designated time slots and for assembling the bits into designated fields; and a transmission path between the first and second microprocessors such that the second microprocessor can send to the first microprocessor the designated fields.

2. The circuit according to claim 1 wherein each frame includes a plurality of time slots and the data link bits are in the first time slot of each frame.

3. The circuit according to claim 1 wherein the designated fields include a concentration field, a maintenance field and an alarm field.

4. The circuit according to claim 3 wherein the first microprocessor is further adapted to transmit the maintenance field to a metallic distribution controller.

5. The circuit according to claim 3 further comprising a third time slot interchanger for transmitting frames of information to the local digital switch and wherein the first microprocessor is further adapted to control the first and third time slot interchangers based on the concentration field.

6. The circuit according to claim 5 wherein the first microprocessor is further adapted to receive a maintenance field and alarm field from a metallic distribution controller, assemble the fields into a packet and transmit the packet to the third time slot interchanger.

7. The circuit according to claim 5 wherein a loop-back path is included between the first and third time slot interchangers and wherein the first microprocessor is further adapted to command the third time slot interchanger to include test data on the loop-back path and adapted to compare the test data put on the loop-back path with test data received by the third time slot interchanger.

8. The circuit according to claim 1 further comprising a transmission path coupled to the second time slot interchanger and adapted for coupling to a plurality of channel units, the second microprocessor being further adapted for scanning data transmitted on said path and detecting the presence of off-hook and on-hook conditions.

9. The circuit according to claim 8 wherein the first microprocessor is further adapted to command the first time slot interchanger to place bits indicating off-hook and on-hook conditions from a test unit onto the designated transmission path and the second microprocessor is further adapted to search for and detect said bits on the designated path rather than on the path adapted for coupling to the channel units.

* * * * *